United States Patent
Kaasalainen et al.

(10) Patent No.: US 10,966,271 B2
(45) Date of Patent: Mar. 30, 2021

(54) CONNECTION SETUP RECOVERY FOR WIRELESS NETWORKS

(71) Applicant: NOKIA TECHNOLOGIES OY, Espoo (FI)

(72) Inventors: Janne Veikko Kaasalainen, Söderkulla (FI); Timo Koskela, Oulu (FI); Samuli Heikki Turtinen, Ii (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 98 days.

(21) Appl. No.: 16/473,935

(22) PCT Filed: Dec. 28, 2016

(86) PCT No.: PCT/EP2016/082743
§ 371 (c)(1),
(2) Date: Jun. 26, 2019

(87) PCT Pub. No.: WO2018/121848
PCT Pub. Date: Jul. 5, 2018

(65) Prior Publication Data
US 2019/0350028 A1 Nov. 14, 2019

(51) Int. Cl.
*H04W 76/18* (2018.01)
*H04W 76/11* (2018.01)
(Continued)

(52) U.S. Cl.
CPC .......... *H04W 76/18* (2018.02); *H04B 7/0617* (2013.01); *H04W 74/0833* (2013.01); *H04W 76/11* (2018.02); *H04W 76/27* (2018.02)

(58) Field of Classification Search
CPC .............. H04B 7/0617; H04W 74/004; H04W 74/0833; H04W 76/11; H04W 76/18; H04W 76/27
See application file for complete search history.

(56) References Cited

U.S. PATENT DOCUMENTS

2014/0177429 A1* 6/2014 Patil .................. H04W 28/0289
370/216
2014/0177607 A1 6/2014 Li et al.
(Continued)

FOREIGN PATENT DOCUMENTS

WO WO 2016/086144 A1 6/2016

OTHER PUBLICATIONS

International Search Report and Written Opinion dated Sep. 13, 2017 corresponding to International Patent Application No. PCT/EP2016/082743.

*Primary Examiner* — Khaled M Kassim
(74) *Attorney, Agent, or Firm* — Squire Patton Boggs (US) LLP

(57) ABSTRACT

A technique includes determining, by a user device, a first preferred downlink beam, sending, by the user device to a base station, an indication of the first preferred downlink beam, receiving, by the user device from the base station, a temporary configuration information at least for use in reporting an updated or second preferred downlink beam, detecting that the user device has not received a connection response message from the base station indicating that a connection has been established between the user device and the base station, determining, by the user device, a second preferred downlink beam, sending, by the user device to a base station in response to the detecting and based at least in part on the temporary configuration information, an indication of the second preferred downlink beam to the base station, and receiving, via the second preferred downlink beam, a connection response message from the base station.

16 Claims, 5 Drawing Sheets

(51) Int. Cl.
*H04B 7/06* (2006.01)
*H04W 74/08* (2009.01)
*H04W 76/27* (2018.01)

(56) References Cited

U.S. PATENT DOCUMENTS

| | | | |
|---|---|---|---|
| 2015/0103770 A1* | 4/2015 | Chang | H04W 76/18 |
| | | | 370/329 |
| 2016/0219570 A1* | 7/2016 | Guo | H04W 72/042 |
| 2016/0309516 A1* | 10/2016 | Wong | H04W 74/0833 |
| 2016/0374006 A1* | 12/2016 | Chen | H04W 74/0833 |
| 2017/0331577 A1* | 11/2017 | Parkvall | H04J 11/0079 |
| 2017/0331670 A1* | 11/2017 | Parkvall | H04W 24/10 |
| 2019/0104549 A1* | 4/2019 | Deng | H04B 7/0617 |
| 2019/0246433 A1* | 8/2019 | Zhu | H04L 5/0073 |

\* cited by examiner

CONNECTION SETUP RECOVERY FOR WIRELESS NETWORKS

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, above 6 GHz. For fifth generation wireless systems (5G), an access architecture for deployment of cellular radio equipment employing mmWave radio spectrum has been proposed. Other example spectrums may also be used, such as cmWave radio spectrum (3-30 GHz).

MIMO (multiple input, multiple output) is an antenna technology for wireless communications in which multiple antennas are used at both the source (transmitter) and the destination (receiver) in order to reduce errors and/or improve data speed.

SUMMARY

According to an example implementation, a method may include determining, by a user device, a first preferred downlink beam, sending, by the user device to a base station, an indication of the first preferred downlink beam, receiving, by the user device from the base station, a temporary configuration information at least for use in reporting an updated or second preferred downlink beam, detecting that the user device has not received a connection response message from the base station indicating that a connection has been established between the user device and the base station, determining, by the user device, a second preferred downlink beam, sending, by the user device to a base station in response to the detecting and based at least in part on the temporary configuration information, an indication of the second preferred downlink beam to the base station, and receiving, via the second preferred downlink beam, a connection response message from the base station.

According to an example implementation, an apparatus includes at least one processor and at least one memory including computer instructions, when executed by the at least one processor, cause the apparatus to: determine, by a user device, a first preferred downlink beam, send, by the user device to a base station, an indication of the first preferred downlink beam, receive, by the user device from the base station, a temporary configuration information at least for use in reporting an updated or second preferred downlink beam, detect that the user device has not received a connection response message from the base station indicating that a connection has been established between the user device and the base station, determining, by the user device, a second preferred downlink beam, send, by the user device to a base station in response to the detecting and based at least in part on the temporary configuration information, an indication of the second preferred downlink beam to the base station, and receive, via the second preferred downlink beam, a connection response message from the base station.

According to an example implementation, an apparatus includes means for determining, by a user device, a first preferred downlink beam, means for sending, by the user device to a base station, an indication of the first preferred downlink beam, means for receiving, by the user device from the base station, a temporary configuration information at least for use in reporting an updated or second preferred downlink beam, means for detecting that the user device has not received a connection response message from the base station indicating that a connection has been established between the user device and the base station, means for determining, by the user device, a second preferred downlink beam, means for sending, by the user device to a base station in response to the detecting and based at least in part on the temporary configuration information, an indication of the second preferred downlink beam to the base station, and means for receiving, via the second preferred downlink beam, a connection response message from the base station.

According to an example implementation, a computer program product includes a computer-readable storage medium and storing executable code that, when executed by at least one data processing apparatus, is configured to cause the at least one data processing apparatus to perform a method including: determining, by a user device, a first preferred downlink beam, sending, by the user device to a base station, an indication of the first preferred downlink beam, receiving, by the user device from the base station, a temporary configuration information at least for use in reporting an updated or second preferred downlink beam, detecting that the user device has not received a connection response message from the base station indicating that a connection has been established between the user device and the base station, determining, by the user device, a second preferred downlink beam, sending, by the user device to a base station in response to the detecting and based at least in part on the temporary configuration information, an indication of the second preferred downlink beam to the base station, and receiving, via the second preferred downlink beam, a connection response message from the base station.

According to an example implementation, a method may include determining, by a user device, a first preferred downlink beam and a first random access preamble associated with the first preferred downlink beam, sending, by the user device to a base station, the first random access preamble, as part of a first random access procedure, to indicate the first preferred downlink beam to the base station, receiving, by the user device from the base station as part of the first random access procedure, a contention resolution message, starting a timer based on the contention resolution message, determining, by the user device, a second preferred downlink beam and a second random access preamble associated with the second preferred downlink beam, detecting an expiration of the timer without the user device receiving a connection response message from the base station that indicates a connection has been established between the user device and the base station, sending, by the user device to the base station in response to the detecting, the second random access preamble, as part of a second random access procedure, to indicate the second preferred downlink beam, and receiving, via the second preferred downlink beam, a connection response message from the base station.

According to an example implementation, an apparatus includes at least one processor and at least one memory including computer instructions, when executed by the at least one processor, cause the apparatus to: determine, by a user device, a first preferred downlink beam and a first random access preamble associated with the first preferred downlink beam, send, by the user device to a base station, the first random access preamble, as part of a first random access procedure, to indicate the first preferred downlink beam to the base station, receive, by the user device from the base station as part of the first random access procedure, a contention resolution message, start a timer based on the contention resolution message, determine, by the user device, a second preferred downlink beam and a second random access preamble associated with the second preferred downlink beam, detect an expiration of the timer without the user device receiving a connection response message from the base station that indicates a connection has been established between the user device and the base station, send, by the user device to the base station in response to the detecting, the second random access preamble, as part of a second random access procedure, to indicate the second preferred downlink beam, and receive, via the second preferred downlink beam, a connection response message from the base station.

According to an example implementation, an apparatus includes means for determining, by a user device, a first preferred downlink beam and a first random access preamble associated with the first preferred downlink beam, means for sending, by the user device to a base station, the first random access preamble, as part of a first random access procedure, to indicate the first preferred downlink beam to the base station, means for receiving, by the user device from the base station as part of the first random access procedure, a contention resolution message, means for starting a timer based on the contention resolution message, means for determining, by the user device, a second preferred downlink beam and a second random access preamble associated with the second preferred downlink beam, means for detecting an expiration of the timer without the user device receiving a connection response message from the base station that indicates a connection has been established between the user device and the base station, means for sending, by the user device to the base station in response to the detecting, the second random access preamble, as part of a second random access procedure, to indicate the second preferred downlink beam, and means for receiving, via the second preferred downlink beam, a connection response message from the base station.

According to an example implementation, a computer program product includes a computer-readable storage medium and storing executable code that, when executed by at least one data processing apparatus, is configured to cause the at least one data processing apparatus to perform a method including: determining, by a user device, a first preferred downlink beam and a first random access preamble associated with the first preferred downlink beam, sending, by the user device to a base station, the first random access preamble, as part of a first random access procedure, to indicate the first preferred downlink beam to the base station, receiving, by the user device from the base station as part of the first random access procedure, a contention resolution message, starting a timer based on the contention resolution message, determining, by the user device, a second preferred downlink beam and a second random access preamble associated with the second preferred downlink beam, detecting an expiration of the timer without the user device receiving a connection response message from the base station that indicates a connection has been established between the user device and the base station, sending, by the user device to the base station in response to the detecting, the second random access preamble, as part of a second random access procedure, to indicate the second preferred downlink beam, and receiving, via the second preferred downlink beam, a connection response message from the base station.

The details of one or more examples of implementations are set forth in the accompanying drawings and the description below. Other features will be apparent from the description and drawings, and from the claims.

DETAILED DESCRIPTION

Figure 1:
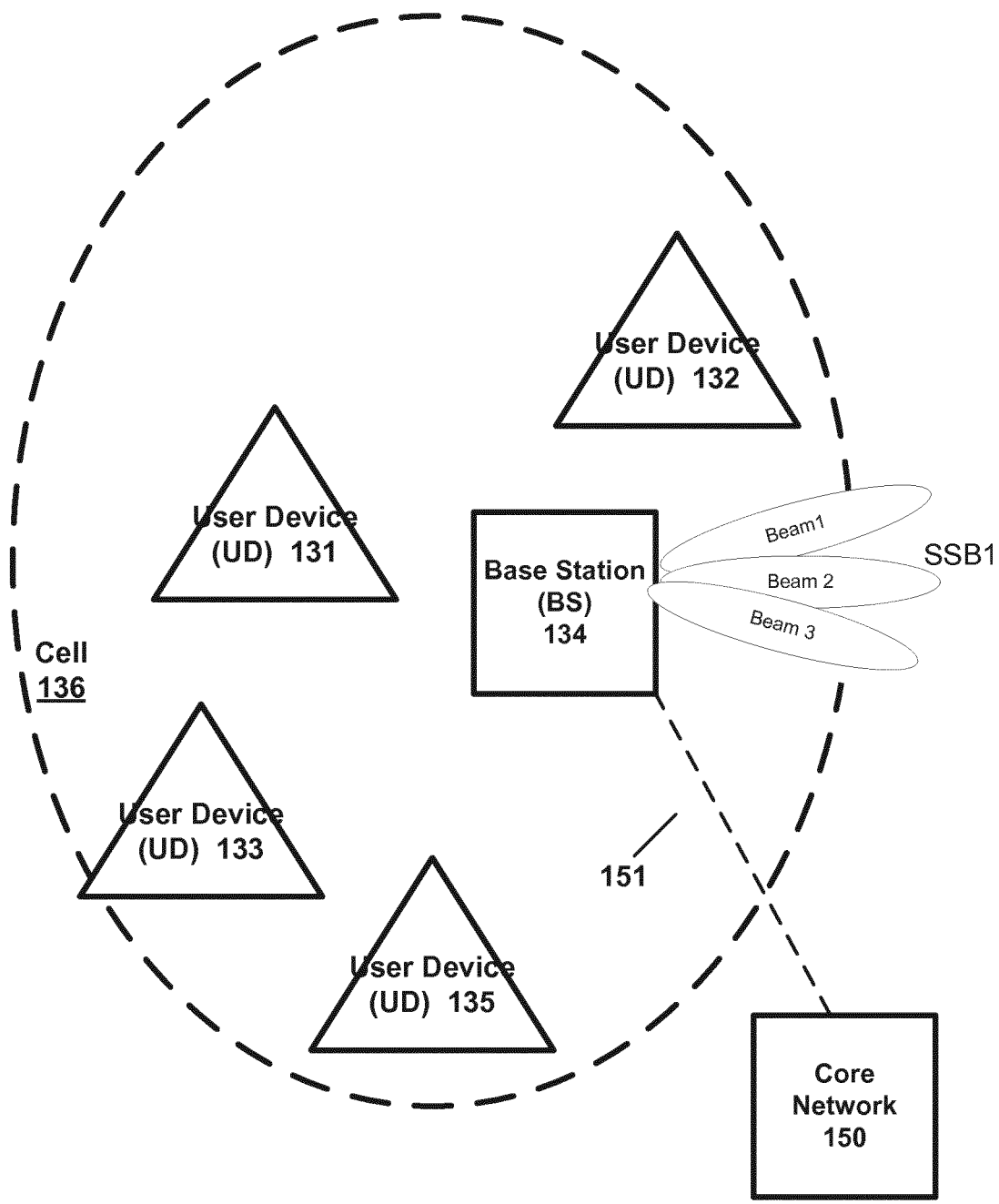
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, or any other wireless network. LTE, 5G, cmWave and mmWave band networks are provided only as illustrative examples, and the various example implementations may be applied to any wireless technology/wireless network.

Various example implementations may relate, for example, to 5G radio access systems (or other systems) with support for Massive MIMO (multiple input, multiple output) and optimized for operating in high carrier frequencies such as cmWave frequencies (e.g. from 3 GHz onwards) or mmWave frequencies, as examples, according to an illustrative example implementation. Those illustrative systems are typically characterized by the need for high antenna gain to compensate for increased pathloss and by the need for high capacity and high spectral efficiency to respond to ever increasing wireless traffic. According to an example implementation, the increased attenuation at higher carrier frequencies may, for example, be compensated by introducing massive (multi-element) antenna arrays and correspondingly antenna gain via beamforming at the access point (AP)/base station (BS) and/or user device. The spectral efficiency may typically improve with the number spatial streams the system can support and thus with the number of antenna ports at the BS. According to an example implementation, spatial multiplexing may include a transmission technique in MIMO wireless communication to transmit independent and separately encoded data signals, so-called streams, from each of the multiple transmit antennas.

For example, for massive multiple input multiple output (M-MIMO) system, a large number of antenna elements may typically be used at a transmitter and/or receiver (e.g., at a base station/access point or other network node). M-MIMO may typically have more spatial links/layers and provides more spatial degrees of freedom. In an illustrative example, with well designed antenna weights, a MIMO or M-MIMO transmitter can generate relatively narrow beams with good spatial separation. Thus, such a transmitter can achieve greater beamforming gain, reduce the spatial interference range and obtain greater multiple user spatial multiplexing gain. A MIMO or M-MIMO system may typically have better performance in terms of data rate and link reliability compared with other systems.

For example, as shown in FIG. 1, to cover a cell, multiple beams are needed. However, in many cases, only a subset of beams can be active at the same time, e.g., to reduce cost and complexity. Different transceiver architectures may be used for 5G radio access system: digital, analogue or so-called hybrid, which utilizes a hybrid of digital baseband processing (such as MIMO Multiple Input Multiple Output and/or digital precoding). Although some aspects of example implementations may be discussed in the context of analogue beamforming (fully analogue or hybrid transceiver) it should be appreciated that the methods and example implementations are applicable also for digital beamforming transceiver architecture.

According to an example implementation, to compensate for the increased path loss when operating on higher frequencies, beamforming is essential for providing cell coverage. The aforementioned transceiver architectures allows for implementing beam forming in future or 5G radio systems depending on the cost and complexity limitations. As an example, systems deployed to lower frequencies (~sub 6 GHz) may be implemented by using fully digital architecture, and the higher frequencies where the number of antenna elements required for cell coverage may range from tens to hundreds may be implemented by using hybrid-architecture, or even fully analogue architecture.

In 5G, a so-called beam sweeping (sweeping subframe or synchronization signal-burst (SS-burst)) may be introduced to provide coverage for common control channel signalling with beam forming. Sweeping sub frame/SS-burst may include SS-blocks blocks (SSB) where a single SS block covers a specific area of the cell with a set of active beams. A total number of beams required to cover required cell area is typically much larger than the number of concurrent active beams the BS/AP is able to form. Therefore, BSs/APs need to sweep through the cell coverage area in time domain by activating different sets of beams on each SSB.

Thus, beam sweeping may be performed to generate or activate each of a plurality of sets of beams in the time domain in order to transmit signals across a cell. For example, only one beam may be active, or a set of beams (e.g., 3 beams, 4 beams, 6 beams, or some other number of beams) may be active at a time. Various control signals, such as synchronization signals (SSs), beam-specific reference signals (RSs), Physical broadcast channel (PBCH), PBCH demodulation reference signals (PBCH-DMRS), Channel State Information Reference Signals (CSI-RS), Beam specific CSI-RS, Mobility Reference Signals (MRS) etc., may be transmitted by BS 134 for typically only one set of beams or for one SS block at a time. In one example SS may comprise of Primary SS (PSS), Secondary SS (SSS) and additional SS such TSS/ESS (Tertiary Synchronization Signal, Extended Synchronization Signal). While the PSS and SSS may encode a cell identity (such as PCI, physical cell ID) the additional SS may encode the SS-block identifier. Thus, one set of beams or SS block (SSB1) is shown for the BS 134, including beam 1, beam 2, and beam 3, as an illustrative example. Other sets of beams or SS blocks may also be provided by BS 134. BS 134 may sweep across each beam or across each set of beams or SS block, for example. Thus, SS block 1 (SSB1 may include a synchronization signal transmitted at the same time on each of beam 1, beam 2 and beam 3, for example. Synchronization signals may be transmitted for other SS blocks as the BS 134 sweeps around. Alternatively, the BS may transmit control signals, such as a synchronization signal on only one beam at a time.

Additionally, SS block may include beam specific reference signals enabling UE to distinguish and measure different beams in a specific SS block In one example the different signals of an SS block may transmitted in different manner: SS/PBCH or other signals may be transmitted using all the beams of an SS block while beam specific signals are transmitted using individual beams.

According to an example embodiment, a user device 132 may measure each of a plurality of beams and determine a best or preferred downlink (DL) transmit beam/SS block that was applied by the BS 134. For example, the user device may measure a signal strength, amplitude or other signal characteristic for each of the beam or non-beam-specific signals (e.g., reference signals, synchronization signals (e.g. SS), or other control signals), and then may determine the best DL transmit beam or alternatively best SS block. According to an example implementation, the user device 132 may send a beam report to the BS 134 to indicate a best or preferred beam, or a best or preferred set of beams or the SS-block, for example. The BS 134 may then use such identified preferred beam(s) to transmit to the user device 132. However, in 5G or other wireless systems operating at relatively high frequency, the preferred beam for a user device 132 may change very rapidly (e.g., based on user device movement or rotation), which may cause, in some cases, the BS 134 to transmit data or control signals to the user device 132 using a non-preferred beam, which may result in the user device being unable to receive or decode the received information, for example.

Figure 2:
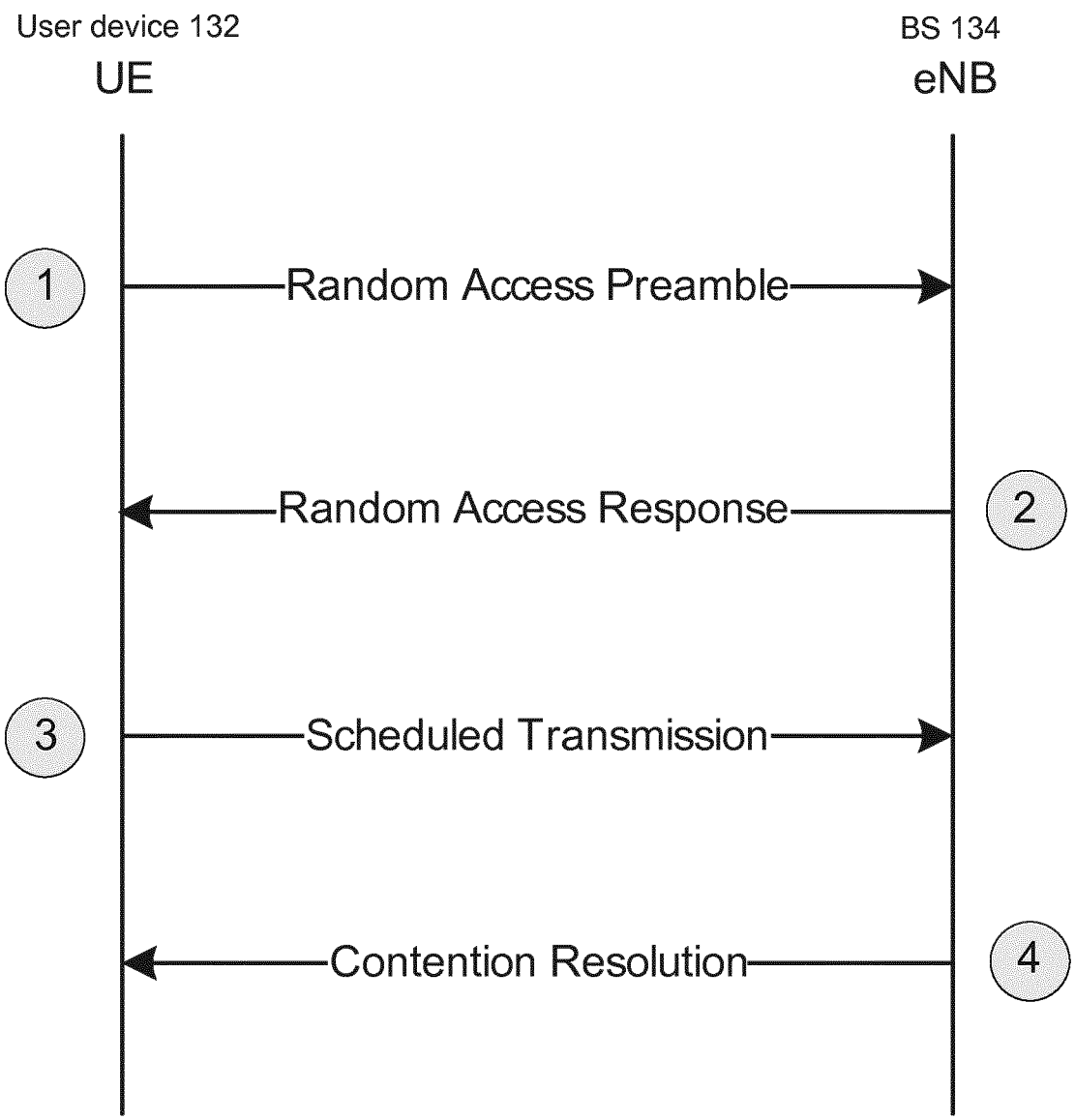
FIG. 2 is a diagram of a contention based random access procedure according to an example implementation.

FIG. 2 is a diagram of a contention based random access procedure 200 according to an example implementation. The random access procedure 200 includes a four step procedure. According to an example implementation, a random access preamble(s) may be provided for each of a plurality of beams. Thus, the user device may indicate to the BS a preferred beam by transmitted the random access preamble associated with such preferred DL transmit beam. According to an example implementation, user device may determine a preferred DL transmit beam (based on signals received from they BS 134 for each of a plurality of beams), and then select a random access preamble associated with such preferred or best DL beam. In one further example, RA (random access) preamble(s) may be associated to specific SS-block instead of an individual beam of the SS-block. In this case BS may determine the best DL beam by determining which beam received the strongest RA preamble signal. BS may then further communicate this to UE. In case of reciprocity is assumed between DL and UL channels, the best DL transmit beam may also be the best UL reception beam. In case of non-reciprocity assumption, a RA (random access) procedure may be used to identify also the best UL beam.

With respect to FIG. 2, at message 1, the user device 132 sends a random access preamble associated with a preferred DL transmit beam. At message 2, the BS 134 may then send a random access response, e.g., which may include a timing advance, a radio network temporary identifier (RNTI, or temporary cell specific RNTI (TC-RNTI)) assigned to the user device 132 (to identify the user device 132 within a cell), and an uplink grant indicating uplink resources for transmitting to the BS 134. At message 3, the user device 132 send information to the BS 134 via the resources allocated to the user device 132 based on the uplink grant. For example, an idle mode UE may send a connection request to indicate that the user device has data to transmit. At message 4, the BS 134 may send a contention resolution message, including the RNTI of the user device, that confirms that there was no collision between the random access preamble transmitted by user device 132 and the random access preamble transmitted by another user device (e.g., a collision may occur where two user devices transmit the same random access preamble). If a connection has been setup between the user device 132 and the BS 134, message 4 (the contention resolution message) may include a radio resource control (RRC) connection setup (or connection resume or connection re-establishment) message, e.g., RRC-ConnectionSetup message that confirms a connection has been setup and may provide beam tracking parameters, e.g., to allow the user device 132 to search and find or monitor a better preferred beam (DL transmit beam), and then report this updated preferred beam to the BS 134.

However, there may be circumstances that may delay the transmission of the RRC connection setup (or connection resume, or connection re-establishment, or other connection response) message. For example, in 5G, BS functions may be split into two entities, e.g., including a RRC (radio resource control) entity, and a PDCP (packet data control protocol) entity provided within a central unit (e.g., within a cloud-based BS), while providing other BS-related functions, such as RLC (radio link control) entity, MAC (media access control) entity, and PHY (physical layer) entity at each distributed unit. Thus, in some cases the latency between the central unit and each distributed unit may, at least in some cases, cause a delay in a delivery of a RRC connection response (e.g., RRC connection setup message, RRC connection resume message, . . . ) to the distributed unit, e.g., such that a contention resolution message (message 4 in FIG. 2) may be transmitted to the user device 132 without the RRC connection response (e.g., RRC connection setup message) that includes the beam tracking parameters. This may be required by the BS to solve the possible contention in random access procedure as early as possible.

As noted above, the preferred beam or best beam (preferred downlink transmit beam applied by BS 134) may change rapidly for 5G networks. Thus, for example, the preferred DL transmit beam for the user device 132 may change, e.g., after receipt of the contention resolution message (message 4) and while the user device 132 is still waiting to receive the connection response message (e.g., RRC connection setup message or RRC connection resume or other connection response message) that may typically include the beam tracking parameters, the preferred downlink transmit beam for the user device 132 may change. Thus, for example, when the BS 134 finally transmits the connection response message to the user device 132, the connection response message may be sent from the BS 134 to the user device 132 using the previous preferred DL transmit beam (which is no longer the preferred beam for the user device). Thus, because the user device 132 has not been performing beam tracking (measuring and comparing beams, and if necessary, updating its preferred beam via beam report to the BS 134) because the beam tracking parameters have not been received via a connection response, the BS 134 sent the delayed connection response message via a non-preferred beam. Thus, this may frequently prevent the user device from successfully decoding the connection response message, and the user device 132 may then start a second (or a new) random access procedure with the BS 134, for example. Thus, various example techniques are described to allow a user device to measure and report an updated preferred beam, e.g., even in the case of a delayed connection response message.

According to an example implementation, a user device may determine a first preferred downlink beam, and may report this first preferred downlink beam to the BS. For example, the user device may report the first preferred DL beam by sending a random access preamble associated with the first preferred DL beam, or other technique that may be used to communicate this first preferred DL beam. The user device may then receive from the BS a temporary configuration information. According to an example implementation, the temporary configuration information, received by the user device/UE may include one or both of the following two information items: 1) a RNTI assigned to the user device that is provided within a random access response from the BS, or 2) a resource information, temporarily assigned to the user device that identifies a resource for reporting a second or updated preferred DL beam. The resource information may be, for example, a scheduling request (SR) to allow the user device to report a preferred DL beam or to allow the user device to request a resource to send a beam report to identify one or more preferred beams or beam sets. In some example implementations/embodiments, the temporary configuration information may include both of 1) and 2).

According to an example implementation, the temporary configuration information, or at least the resource information (information item 2) above) should be received by the user device/UE along with a contention resolution message (described below) so that multiple UEs will not be using the same beam management information.

According to an example implementation, the user device may then receive a contention resolution message (e.g., message 4), but without a connection response (e.g., RRC connection setup) message. In response to receiving the contention resolution message and/or detecting that a connection response message was not received, the user device may initiate a connection setup timer. At the expiration of the connection setup timer, the user device may then determine a second (or updated) preferred DL beam, and may then communicate this second preferred DL beam to the BS (assuming that no connection response has been received), e.g., either by: 1) performing a second random access procedure, including sending a second random access preamble (e.g., as part of a second random access procedure) associated with the second preferred DL beam, and sending the RNTI, obtained via a first random access procedure, within the second random access procedure to identify the user device to the BS; or 2) sending an indication of the second or updated preferred DL beam by sending a beam report via the resource (e.g., scheduling request) or via a resource obtained in response to sending a request via the SR or resource. Thus, the configuration information may be used to send or communicate the updated or second preferred DL transmit beam to the BS.

Once the BS has received an indication of an updated or second preferred DL beam for the user device, the BS may then be able to send the user device the connection response (e.g., RRC connection setup or RRC connection resume message) via the updated or second preferred DL transmit beam, so that the user device will be able to decode the received connection response (e.g., because the connection response will be sent with the current preferred DL transmit beam of the user device). Alternatively, rather than waiting for expiration of a timer (e.g., a connection setup timer), the user device may simply measure beams from the BS (e.g., using a default set of beam tracking parameters), and then may report the updated or second preferred DL transmit beam to the BS as necessary (e.g., without waiting for the timer to expire). In one example implementation, the timer is configured to have value of zero or '0 ms', which may indicate to the UE that it should immediately perform beam tracking and indicate alternative preferred beam according to the beam tracking parameters (e.g., based on a default set of beam tracking parameters, such as an offset (or threshold) that the new preferred beam should be better than the old preferred beam).

Various example implementations may be used to cause or trigger the user device/UE to perform beam tracking and send an updated preferred DL beam, where some implementations may wait for a timer to expire, while other example implementations may provide for the UE to immediately begin or continue beam tracking. For example, in a first option, the UE will at once (e.g., after receiving the contention resolution message 4, or possibly continuously throughout random access procedure) start beam tracking and send the indication of the second preferred beam if such is found. In another option, the UE may wait for the connection setup timer to expire before performing beam tracking and sending the updated/second preferred DL transmit beam indication to the BS. The exact operation of the UE may be based on a configuration received in the contention resolution message, may be based on a default configuration specified, or may be based on a configuration signaled commonly in the cell for all the UEs, e.g., via the system information.

In one option these options could be run in parallel where the UE can omit the timer expiration if second best beam becomes offset better than the first best beam or the first best beam becomes lower than an absolute threshold while the second best beam remains above the threshold.

Figure 3:
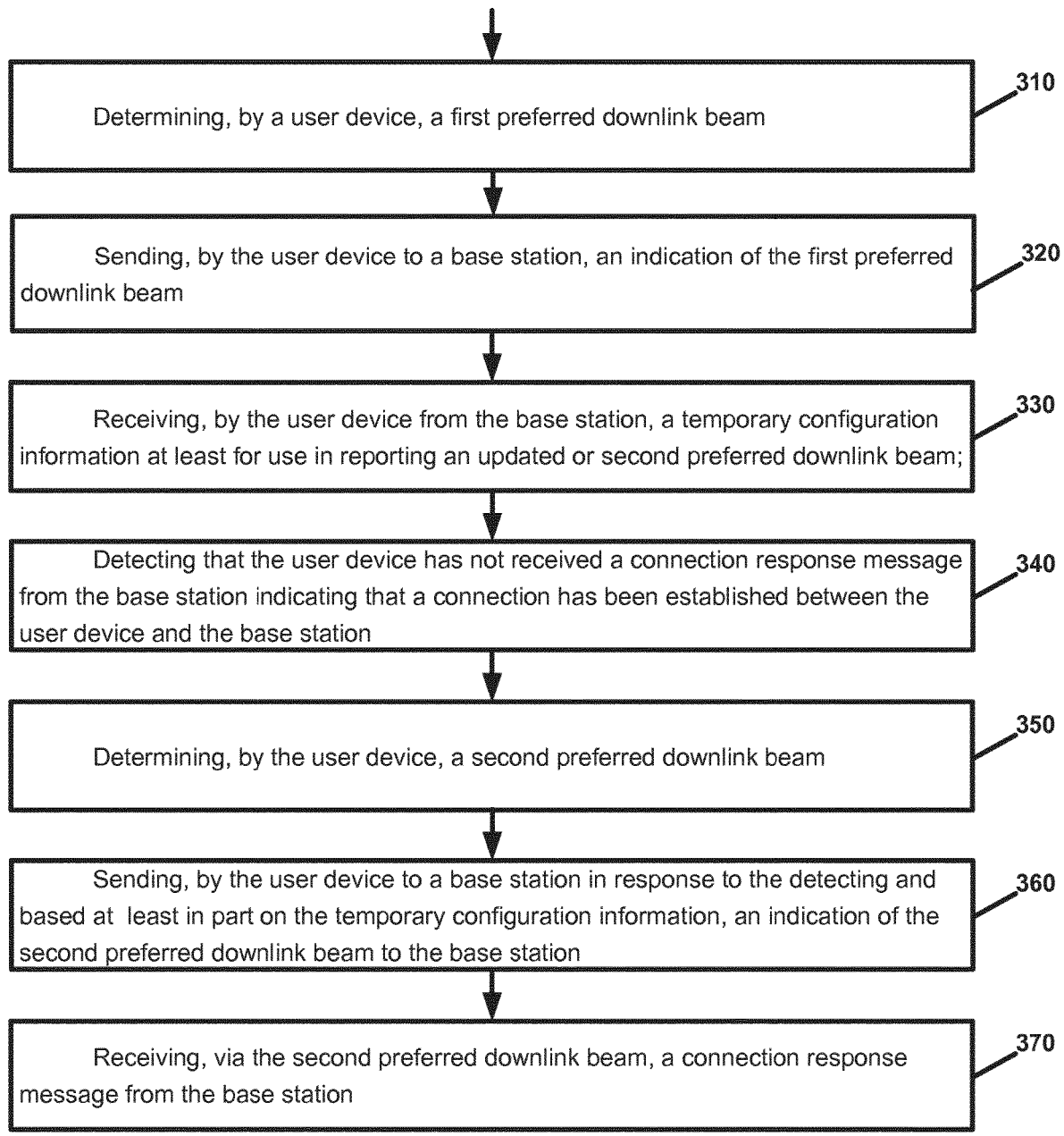
FIG. 3 is a flow chart illustrating operation of a user device according to an example implementation.

FIG. 3 is a flow chart illustrating operation of a user device according to an example implementation. Operation 310 includes determining, by a user device, a first preferred downlink beam. Operation 320 includes sending, by the user device to a base station, an indication of the first preferred downlink beam. Operation 330 includes receiving, by the user device from the base station, a temporary configuration information at least for use in reporting an updated or second preferred downlink beam. Operation 340 includes detecting that the user device has not received a connection response message from the base station indicating that a connection has been established between the user device and the base station. Operation 350 includes determining, by the user device, a second preferred downlink beam. Operation 360 includes sending, by the user device to a base station in response to the detecting and based at least in part on the temporary configuration information, an indication of the second preferred downlink beam to the base station. Operation 370 includes receiving, via the second preferred downlink beam, a connection response message from the base station.

According to an example implementation of the method of FIG. 3, the temporary configuration information includes at least one of: a radio network temporary identifier (RNTI) assigned to the user device; and a resource information, temporarily assigned to the user device, that identifies a resource for reporting the second preferred downlink beam to the base station.

According to an example implementation of the method of FIG. 3, the temporary configuration information may include: a radio network temporary identifier (RNTI) assigned to the user device, the method further including: receiving, by the user device from the base station, the radio network temporary identifier within a first random access procedure; and, sending, by the user device to the base station, the radio network temporary identifier within a second random access procedure that is used to send or report the second preferred downlink beam to the base station.

According to an example implementation of the method of FIG. 3, the temporary configuration information includes: a resource information, temporarily assigned to the user device, that identifies a resource for a scheduling request or other uplink resource to be used by the user device to report or send the indication of the second preferred downlink beam to the base station.

According to an example implementation of the method of FIG. 3, the resource information includes at least one of the following: a temporary scheduling request (SR) resource that is user device-specific, to allow the user device to request an uplink grant for reporting a beam report, and, a temporary scheduling request (SR) resource that includes a plurality of beam-specific resources that the user device may use to identify one or more preferred downlink beams.

According to an example implementation of the method of FIG. 3, the sending an indication of the first preferred downlink beam includes sending a first random access preamble associated with the first preferred downlink beam, as part of a first random access procedure, to indicate the first preferred downlink beam to the base station; the sending an indication of the second preferred downlink beam includes sending, by the user device to the base station in response to the detecting, a second random access preamble associated with the second preferred downlink beam, as part of a second random access procedure, to indicate the second preferred downlink beam; and wherein a radio network temporary identifier, obtained by the user device via the first random access procedure, is sent to the base station as part of the second random access procedure.

According to an example implementation of the method of FIG. 3, and further including receiving, by the user device from the base station as part of the first random access procedure, a contention resolution message; starting a timer based on the contention resolution message; detecting an expiration of the timer without the user device receiving a connection response message from the base station that indicates a connection has been established between the user device and the base station; and wherein the sending the second random access preamble comprises sending, by the user device to the base station in response to the detecting, the second random access preamble, as part of a second random access procedure, to indicate the second preferred downlink beam.

According to an example implementation of the method of FIG. 3, the receiving a temporary configuration includes receiving, by the user device from the base station, a resource configuration that indicates uplink resources to be used by the user device to report one or more preferred downlink beams, and the method further including: receiving, by the user device from the base station, a contention resolution message; starting a timer based on the contention resolution message; sending, by the user device to the base station via the uplink resources, until expiration of the timer or until receipt of a connection response message from the base station that indicates a connection has been established between the user device and the base station, one or more beam reports indicating one or more preferred downlink beams.

According to an example implementation of the method of FIG. 3, the uplink resources for reporting the beam reports includes a temporary scheduling request resource that is user device-specific, to allow the user device to request an uplink grant for reporting a beam report.

According to an example implementation of the method of FIG. 3, the uplink resources for reporting the beam reports includes a temporary scheduling request resource that includes a plurality of beam-specific resources that the user device may use to identify one or more preferred downlink beams.

According to an example implementation of the method of FIG. 3, and further including: receiving, by the user device, a default set of beam tracking parameters including a threshold value, via a contention resolution message from the base station without receiving a connection response message; wherein the determining a second preferred downlink beam includes, determining, based on the default set of beam tracking parameters, a second preferred downlink beam that is the threshold value better than the first preferred downlink beam; and wherein the sending, the indication of the second preferred downlink beam to the base station includes sending, by the user device, an indication of the second preferred downlink beam by either sending a random access preamble associated with the second preferred downlink beam or an indication of the second downlink beam via an uplink resource allocated to the user device.

According to an example implementation of the method of FIG. 3, the determining a first preferred downlink beam includes: performing, by the user device, beam-level measurements for one or more downlink beams.

According to an example implementation of the method of FIG. 3, the determining a first preferred downlink beam includes: performing, by the user device, beam set measurements for each of one or more sets of beams; sending, by the user device to the base station, an indication of a preferred downlink set of beams; and receiving, by the user device from the base station, an indication of a first preferred downlink beam within the preferred downlink set of beams that was indicated to the base station.

According to an example implementation, a computer program product includes a non-transitory computer-readable storage medium and storing executable code that, when executed by at least one data processing apparatus, is configured to cause the at least one data processing apparatus to perform a method including: determining, by a user device, a first preferred downlink beam; sending, by the user device to a base station, an indication of the first preferred downlink beam; receiving, by the user device from the base station, a temporary configuration information at least for use in reporting an updated or second preferred downlink beam; detecting that the user device has not received a connection response message from the base station indicating that a connection has been established between the user device and the base station; determining, by the user device, a second preferred downlink beam; sending, by the user device to a base station in response to the detecting and based at least in part on the temporary configuration information, an indication of the second preferred downlink beam to the base station; and receiving, via the second preferred downlink beam, a connection response message from the base station.

According to another example implementation, an apparatus includes at least one processor and at least one memory including computer instructions, when executed by the at least one processor, cause the apparatus to: determine, by a user device, a first preferred downlink beam; send, by the user device to a base station, an indication of the first preferred downlink beam; receive, by the user device from the base station, a temporary configuration information at least for use in reporting an updated or second preferred downlink beam; detect that the user device has not received a connection response message from the base station indicating that a connection has been established between the user device and the base station; determine, by the user device, a second preferred downlink beam; send, by the user device to a base station in response to the detecting and based at least in part on the temporary configuration information, an indication of the second preferred downlink beam to the base station; and receive, via the second preferred downlink beam, a connection response message from the base station.

According to an example implementation of the apparatus, the temporary configuration information includes at least one of: a radio network temporary identifier (RNTI) assigned to the user device; and a resource information, temporarily assigned to the user device, that identifies a resource for reporting the second preferred downlink beam to the base station.

According to an example implementation of the apparatus, the temporary configuration information includes: a radio network temporary identifier (RNTI) assigned to the user device; and the computer instructions further causing the apparatus to: receive, by the user device from the base station, the radio network temporary identifier within a first random access procedure; and send, by the user device to the base station, the radio network temporary identifier within a second random access procedure that is used to send or report the second preferred downlink beam to the base station.

According to an example implementation of the apparatus, the temporary configuration information includes: a resource information, temporarily assigned to the user device, that identifies a resource for a scheduling request or other uplink resource to be used by the user device to report or send the indication of the second preferred downlink beam to the base station.

According to an example implementation of the apparatus, the resource information includes at least one of the following: a temporary scheduling request (SR) resource that is user device-specific, to allow the user device to request an uplink grant for reporting a beam report; and, a temporary scheduling request (SR) resource that includes a plurality of beam-specific resources that the user device may use to identify one or more preferred downlink beams.

According to an example implementation of the apparatus, the causing the apparatus to send an indication of the first preferred downlink beam includes causing the apparatus to send a first random access preamble associated with the first preferred downlink beam, as part of a first random access procedure, to indicate the first preferred downlink beam to the base station; causing the apparatus to send an indication of the second preferred downlink beam includes causing the apparatus to send, by the user device to the base station in response to the detecting, a second random access preamble associated with the second preferred downlink beam, as part of a second random access procedure, to indicate the second preferred downlink beam; and wherein a radio network temporary identifier, obtained by the user device via the first random access procedure, is sent to the base station as part of the second random access procedure.

According to an example implementation of the apparatus, and further causing the apparatus to: receive, by the user device from the base station as part of the first random access procedure, a contention resolution message; start a timer based on the contention resolution message; detect an expiration of the timer without the user device receiving a connection response message from the base station that indicates a connection has been established between the user device and the base station; and wherein the apparatus to send the second random access preamble includes causing the apparatus to send, by the user device to the base station in response to the detecting, the second random access preamble, as part of a second random access procedure, to indicate the second preferred downlink beam.

According to an example implementation of the apparatus, wherein causing the apparatus to receive a temporary configuration includes causing the apparatus to receive, by the user device from the base station, a resource configuration that indicates uplink resources to be used by the user device to report one or more preferred downlink beams; and the computer instructions further causing the apparatus to: receive, by the user device from the base station, a contention resolution message; start a timer based on the contention resolution message; and send, by the user device to the base station via the uplink resources, until expiration of the timer or until receipt of a connection response message from the base station that indicates a connection has been established between the user device and the base station, one or more beam reports indicating one or more preferred downlink beams.

According to an example implementation of the apparatus, the uplink resources for reporting the beam reports include a temporary scheduling request resource that is user device-specific, to allow the user device to request an uplink grant for reporting a beam report.

According to an example implementation of the apparatus, the uplink resources for reporting the beam reports include a temporary scheduling request resource that includes a plurality of beam-specific resources that the user device may use to identify one or more preferred downlink beams.

According to an example implementation of the apparatus, the computer instructions further cause the apparatus to: receive, by the user device, a default set of beam tracking parameters including a threshold value, via a contention resolution message from the base station without receiving a connection response message; wherein causing the apparatus to determine a second preferred downlink beam includes causing the apparatus to determine, based on the default set of beam tracking parameters, a second preferred downlink beam that is the threshold value better than the first preferred downlink beam; and wherein causing the apparatus to send the indication of the second preferred downlink beam to the base station includes causing the apparatus to send, by the user device, an indication of the second preferred downlink beam by either sending a random access preamble associated with the second preferred downlink beam or an indication of the second downlink beam via an uplink resource allocated to the user device.

Figure 4:
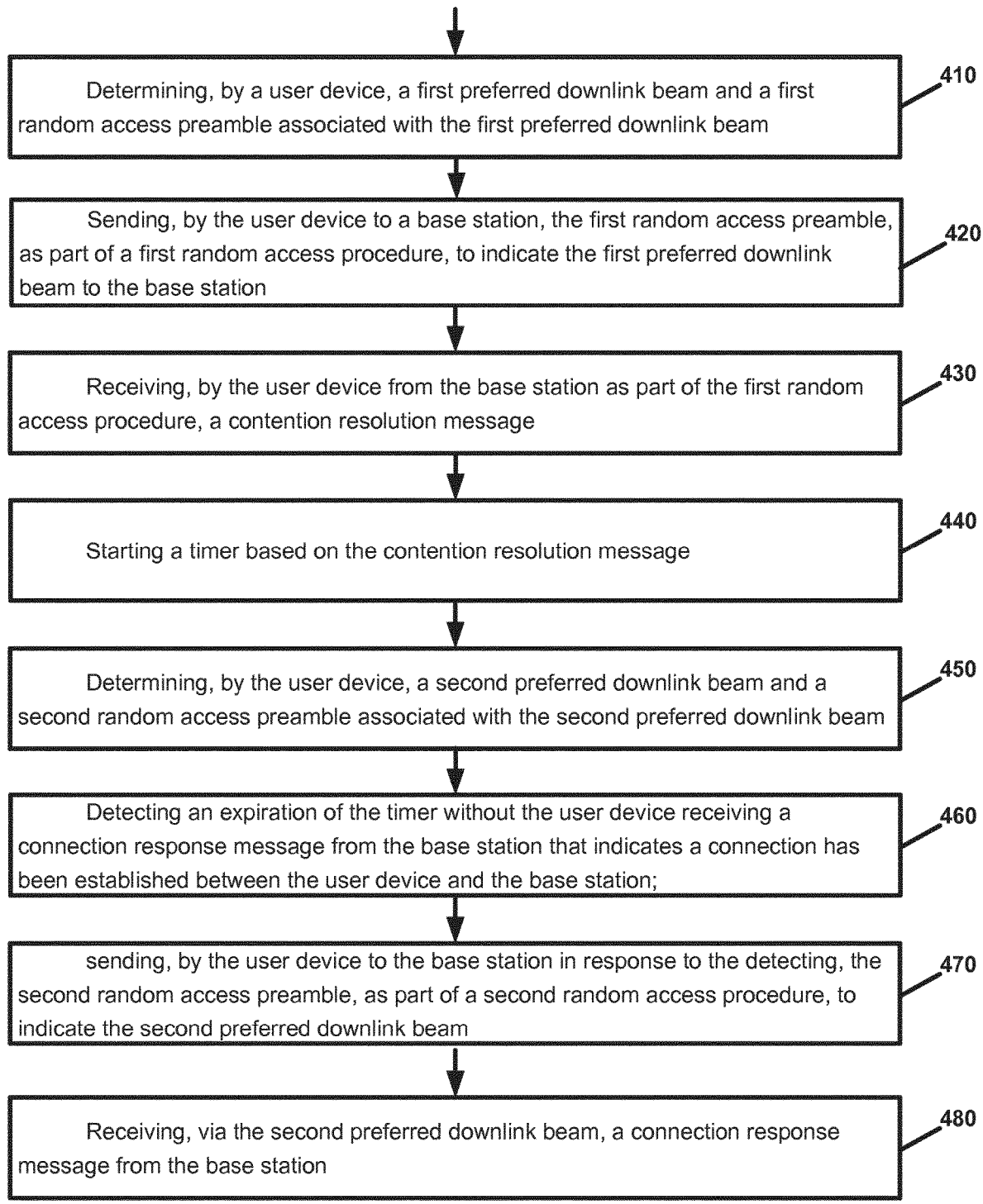
FIG. 4 is a flow chart illustrating operation of a user device according to an example implementation.

FIG. 4 is a flow chart illustrating operation of a user device according to an example implementation. Operation 410 includes determining, by a user device, a first preferred downlink beam and a first random access preamble associated with the first preferred downlink beam. Operation 420 includes sending, by the user device to a base station, the first random access preamble, as part of a first random access procedure, to indicate the first preferred downlink beam to the base station. Operation 430 includes receiving, by the user device from the base station as part of the first random access procedure, a contention resolution message. Operation 440 includes starting a timer based on the contention resolution message. Operation 450 includes determining, by the user device, a second preferred downlink beam and a second random access preamble associated with the second preferred downlink beam. Operation 460 includes detecting an expiration of the timer without the user device receiving a connection response message from the base station that indicates a connection has been established between the user device and the base station. Operation 470 includes sending, by the user device to the base station in response to the detecting, the second random access preamble, as part of a second random access procedure, to indicate the second preferred downlink beam. And, operation 480 includes receiving, via the second preferred downlink beam, a connection response message from the base station.

According to an example implementation of the method of FIG. 4, the method further includes: receiving, by the user device from the base station, a radio network temporary identifier within the first random access procedure; and, sending, by the user device to the base station, the radio network temporary identifier within the second random access procedure to identify the user device to the base station.

An apparatus comprising at least one processor and at least one memory including computer instructions, when executed by the at least one processor, cause the apparatus to determine, by a user device, a first preferred downlink beam and a first random access preamble associated with the first preferred downlink beam; send, by the user device to a base station, the first random access preamble, as part of a first random access procedure, to indicate the first preferred downlink beam to the base station; receive, by the user device from the base station as part of the first random access procedure, a contention resolution message; start a timer based on the contention resolution message; determine, by the user device, a second preferred downlink beam and a second random access preamble associated with the second preferred downlink beam; detect an expiration of the timer without the user device receiving a connection response message from the base station that indicates a connection has been established between the user device and the base station; send, by the user device to the base station in response to the detecting, the second random access preamble, as part of a second random access procedure, to indicate the second preferred downlink beam; and receiving, via the second preferred downlink beam, a connection response message from the base station.

A computer program product, the computer program product comprising a computer-readable storage medium and storing executable code that, when executed by at least one data processing apparatus, is configured to cause the at least one data processing apparatus to perform a method of determining, by a user device, a first preferred downlink beam and a first random access preamble associated with the first preferred downlink beam; sending, by the user device to a base station, the first random access preamble, as part of a first random access procedure, to indicate the first preferred downlink beam to the base station; receiving, by the user device from the base station as part of the first random access procedure, a contention resolution message; starting a timer based on the contention resolution message; determining, by the user device, a second preferred downlink beam and a second random access preamble associated with the second preferred downlink beam; detecting an expiration of the timer without the user device receiving a connection response message from the base station that indicates a connection has been established between the user device and the base station; sending, by the user device to the base station in response to the detecting, the second random access preamble, as part of a second random access procedure, to indicate the second preferred downlink beam; and receiving, via the second preferred downlink beam, a connection response message from the base station.

According to an example implementation, for High Frequency (HF) Random Access procedure, the user device (or UE) may select the strongest DL beam and based on that selects the corresponding RACH preamble (step 1, FIG. 2) (there is a pre-association between DL beams and RACH preambles, so by sending a specific RACH preamble, a specific/best DL beam is being identified). In this manner, the BS/NB has a way to determine where (to which beam direction(s)) it should send the Random Access Response/RAR (step 2, FIG. 2). An IDLE mode UE will send then an RRCConnectionRequest (UE ID and reason for connection, e.g., UE has some data) message in step 3 of FIG. 2 and NB/BS will respond in step 4 of FIG. 2 with RRCConnectionSetup message (or other connection response) or then NB may use early contention resolution and send in step 4 contention resolution (UE ID) only without the RRCConnectionSetup message (in this case the connection response is omitted, or is late).

A UE/user device may use a T300 timer to supervise RRC Connection establishment after sending RRCConnectionRequest, ie., UE RRC layer will issue the RRC Connection establishment as failed if T300 timer expires. For example, the UE may set T300 timer—e.g., about 1 second, when it sends RRC Connection request, and UE waits RRC connection setup; if T300 timer expires, the UE sends RRC Connection request message again, for example. Furthermore, additionally UE uses mac-ContentionResolutionTimer at MAC layer to supervise the success of one Random Access Procedure attempt, i.e., the time between step 3 and step 4 in FIG. 2. Typical value for the mac-ContentionResolutionTimer may be expressed in the number of subframes (sf), e.g., 32 sf, which turns into 32 ms with LTE system and 6.4 ms with some 5G systems as they may employ 0.2 ms subframe length, as an example. For example, when UE first received RA response, and UE sends MAC layer ID to BS, MAC layer of UE sends a UE ID/RNTI to BS, and sets this contention resolution timer; MAC layer of UE is waiting to receive message 4, including connection response—indicating that this RA procedure is completed and connection setup is completed.

RRC connection establishment/resume/activation procedure via Random Access procedure can be supervised by different timers, namely T300 and mac-ContentionResolutionTimer. For example, T300 timer may be a RRC level timer: timer is set when UE sends RRC connection request (is included in message 3). A Contention resolution timer (shorter timer than T300 timer)—for UE is set while waiting for message 4. UE starts/begins the contention resolution timer when sending message 3 to BS; UE/MAC layer restarts random access procedure with same cell if contention resolution timer expires before a contention resolution message (message 4) is received by UE. The contention resolution message (message 4) indicates that there was no random access preamble collision. Message 4 (FIG. 2) is MAC layer message—contention resolution message (MAC layer) may include within it the connection response message (e.g., RRC connection setup message).

When UE initiates the Random Access procedure to network in high frequency networks it may be that UE radio conditions changes immediately after RACH before UE receives the connection response (or RRC connection setup) message, which may have been delayed and thus not included with connection resolution message. During established RRC connection narrow beams and fast radio condition changes are managed by having continuous lower layer L1/L2 beam tracking to be able to fast change the UE from one beam to another beam—this tracking may be configured by the RRC signaling. However, during the Random Access procedure when the beam tracking/management is not yet configured with RRC signaling (e.g., beam tracking parameters not yet received due to delayed connection response message), the beam synchronization (between UE and BS) may be easily lost, e.g., beam tracking is not yet configured by network—per 5G standard, since UE is still waiting for connection setup message (which may typically include beam tracking parameters). Various example implementations relate to beam tracking at UE before UE receives beam tracking parameters in a connection response (e.g., RRC connection setup) message.

However, UE has still the assigned C-RNTI, e.g., during a random access procedure, so PHY/MAC signaling can be used to ensure beam synchronization before the connection response message is received by the UE from the BS/network.

The idea is to enable beam tracking/management during the RRC Connection Establishment/Resume/Re-activation after the UE has received Contention Resolution message (message 4) alone without connection response (e.g., RRC connection setup message) (which will typically include beam tracking parameters) from the BS/network. This can be achieved with a number of different options or alternative implementations. For example, due to split architecture—network may not have processed RRC connection request message yet at RRC level, but BS sends message 4 (contention resolution message) to UE without RRC connection setup message). RRC layer at NW/BS may be delayed in processing the RRC connection request message, and thus, might be omitted from message 4, which means that beam tracking parameters would be omitted from message 4.

In one embodiment upon receiving the Contention Resolution message from the NW/BS, the UE declares the contention resolution as successful (UE received contention resolution message 4, but RRC connection setup message was not included) (i.e., UE stops and resets mac-ContentionResolutionTimer) and triggers a new timer, which may be referred to as a connection setup timer (in cases it did not received RRC connection setup message with beam tracking parameters) which can be configured by the NW/BS in the Contention Resolution message (e.g., in a MAC control element) or via system information the UE acquires before/during it attempts an access. The timer value for this connection setup timer may, for example, be (much) smaller than T300 but bigger than estimated time for NW/BS to allocate and prepare the connection response (e.g., (RRC connection setup message that indicates/confirms to UE that the RRC connection has been setup by the BS/network, or other/similar messages by different name, that would also provide the beam tracking parameters and RRC connection indication).

Thus, various example implementations are provided to allow beam tracking until RRC connection setup is completed, and this may increase a success rate of RRC connection setup, e.g., by allowing UE to provide an updated DL beam indication/beam report to the BS.

According to an example implementation, when UE waits for the RRC response (RRC connection setup message) from the BS/NW, UE also keeps the DL synchronization (maintains the same DL beam it was using) and if UE did not receive the connection response before the new timer expiration (and no connection response or RRC connection setup message was received by UE), UE may then attempt to find a strongest (or updated) DL transmit beam and perform beam recovery (communicate an indication or report of that new preferred beam to BS) using Random Access procedure with BS, for example. The UE uses in this case the already given contention resolution ID, e.g., C-RNTI (this means that Network can identify the UE based on C-RNTI that was previously communicated to UE, and the UE begins a random access procedure again, beginning at step 1, and the RNTI assigned to UE in first random access procedure is sent at message 3 (or other message) within second random access procedure, for example. A 2-step random access procedure may also be employed, e.g., where RNTI/C-RNTI may be resent to BS in first message of second random access procedure, for example. A 2-step random access procedure, or alternatively a 4-step random access procedure may be used for all random access procedures, or the 2-step and 4-step RA procedures may be mixed by the user device, e.g., using some 2 step RA procedures and some 4-step RA procedures.

Once the BS/network receives the RACH preamble (message 1), within the second random access procedure which is associated with the updated or second DL transmit beam, and BS sends a RAR (message 2, within second random access procedure) for the UE, UE responds with the C-RNTI as message 3 within second random access procedure. When the BS/network receives the message 3, the BS knows that this was the UE where it tried to send the connection response (RRC connection setup) message but could not receive a response (via physical layer HARQ signalling or RRC layer confirmation signalling, e.g., with RRCconnectioSetupComplete). Now BS knows the best DL transmit beam (based on the transmitted random access preamble that indicates the updated or second preferred DL transmit beam for this UE) for the UE and that the UE is still there in the cell. The BS/network sends the ready connection response (RRCConnectionsetup) message immediately again, via the correct/updated DL transmit beam, within the Contention Resolution message (message 4 within second random access procedure). This should improve success ratio as UE will now receive and be able to decode the connection response (RRC Connection setup) message quickly after measurement of the best updated DL transmit beam. Option 1 (periodical update according to timer): new timer (connection setup timer) expires, UE will send random access preamble according to best beam, even if it is same as previous best beam. Once the new beam is indicated UE restarts the timer and repeats the actions until the reception of connection setup. Option 2 (update only if best beam changes: new timer (connection setup timer) expires, and the UE would have already identified a new best (updated or second preferred DL transmit) beam based on synchronization signals from BS/cell, and sends a new random access preamble associated with new best DL transmit beam.

According to another example implementation, in order to improve this procedure (described above) further, the BS/network may configure a temporary dedicated UL resource for UE to send a scheduling request (dedicated resource for UE—similar to RACH preamble, but sends scheduling request with 1 bit indication, and BS receives this UE-specific SR-1 bit that is set) configuration for the UE until the new timer expires. (This SR resource allows either a 1 bit indication to send scheduling request to request resources to send beam report, or SR may be multi-bit SR to allow beam report to be sent via SR). In one option the SR configuration (sent in contention resolution message, msg 4) is provided along with the Contention Resolution message as a MAC CE (MAC control element). Alternatively, the BS/NW may proactively provide SR resource in physical layer signalling to be sent via physical uplink control channel (like physical uplink control channel/PUCCH). In one option the UE uses this temporary SR, and UE receives UL grant to provide beam report to identify best beam or best set of beams that UE can detect with respect to synchronization signals from BS/cell, in order to send a beam report to network, to provide regular updated beam report. Thus, UE may send regular or periodic or frequent beam reports via SR or via uplink resource obtained via sending SR. The network may continuously then monitor the SR (the beam report sent via UL grant obtained via SR or the SR itself) and know the preferred DL transmit beam for the user device, and BS can send the connection response, e.g., RRC connection setup message directly via the correct (or currently preferred) DL transmit beam. When NW proactively schedules UE with SR resource in PUCCH, the UE indicates whether it is still in the same beam direction the NW scheduled the allocation. In an example implementation, the SR can be beam specific—to indicate best beam, with different resources associated with different best/preferred beam. Or, the SR configuration may identify a set of resources to be used for SR, and include indication that these resources are beam specific. Note that the dedicated UL resource may be either a one-time resource allocation or alternatively a persistent UL data resource allocation, like (or similar to or even same as) a SPS (semi-persistent scheduling) grant for the UE.

In another example implementation, the UE performs UE event based beam tracking (beam measurement and reporting) by using default measurement parameters (e.g., simply making beam measurements, determining and report updated preferred or best DL transmit beam to BS, and not waiting on a timer to expire before performing beam tracking). Default parameters may include higher layer filtering (filtering parameters e.g. for moving average filtering, Time to Trigger) and offset parameters and threshold values to select new or updated preferred beam. As an example one UE event may be that alternative beam is 'offset' better than the current used beam for a specific amount of time e.g. for N-SS block periods or N milliseconds. Alternatively these parameters may be signalled by NW via MAC CE (MAC control element) (e.g., included within message 4) either by explicilty or using index value pointing to default configurations. In one options the parameters may be scaled from utilized IDLE mode measurement parameters. UE sets the selected DL beam (RACH/random access procedure) as serving beam and compares alternative candidate beams to the serving beam. In case alternative beam becomes offset better UE initiates either SR or RACH based beam selection is used to communicate the updated preferred beam to BS. Thus, in this example implementation, no timer is necessary, and UE proactively, if it finds out current/previous best beam is not suitable, the UE indicates a new best/preferred DL transmit beam to BS. Also, in one example, when a timer is configured to be zero it may implicitly indicate the UE to perform event based beam tracking (e.g., where UE measures different DL transmit beams, and if a better beam is found in accordance with the beam tracking parameters, such as an offset, then the new preferred beam is reported to BS) based upon conditions discussed in various example implementations.

In another example implementation, if UE does not indicate the preferred DL transmit beam in RACH/random access preamble, i.e. all the beams in the SS-block share the preamble space, with a different RACH preamble for each SS block or set of beams, and UE selects one of the sets of beams, and signals this selected set of beams by transmitting an associated random access preamble to BS. BS/Network may determine and then indicate the strongest/preferred DL TX beam to UE by including the beam index in a message (e.g. in msg. 4) or in a separate message. For example, the BS/NW may measure the strongest beam of a sweep block or of a set of beams based on UE preamble transmission. In this case, the RACH (random access) preambles are not beam specific, but are specific to each set of beams or SS block e.g., 3-4 beams used to send reference signals). RACH is not specific to a beam, but specific to a set of beams (an SS block). UE determines best set of beams based on reference signals sent via different sets of beams; then UE sends SS block (or set of beams) specific RACH (specific to a set of beams) to BS, and BS uses these beams to receive this RACH and identify which beam within this indicated set of beams is the best beam, and then BS indicates this best beam to UE. UE starts doing beam tracking within this set of beams—UE now measures each beam, and may select a new beam if it is threshold better than current best DL transmit beam.

In another example implementation, the UE prioritizes the beam management/beam tracking actions over the cell reselection mobility which it performs during waiting for the connection response message (RRC connection setup message). In such a case, the UE does not perform cell reselection measurements, but UE would perform beam tracking—where UE is looking for better beam, and measures beams of a current cell, to see if it needs to switch beams for current cell/BS, and then reports any updated preferred beams to the BS). Some further options for this example implementation may include: 1) UE (continues to) perform(s) beam level measurements and tracking on the current SS-block (current set of beams) while performing SS-block level (set of beams level) measurements (e.g., based on synchronization signal or signals) on alternative SS-block (on alternative sets of beams) of the current cell and/or adjacent cell(s); and 2) In another example implementation, beam level measurements are performed on beams within current cell, and at same time, UE also performs set level measurements by measuring adjacent cells beam measurements—by measuring SS block (by measuring synchronization signals of sets of beams) of adjacent cell, which is more efficient to measure sets of beams for adjacent cells, and to have a finer beam granularity measurement to measure each beam within the current cell of beams.

In yet another example implementation, the BS/NW indicates or instructs the UE to perform either SS-block (set of beams) level measurements or beam level measurements for beam management/beam tracking before receiving the connection response (RRC connection setup) message (e.g. RRCConnectionSetup). BS/Network configures UE to measure the current cell in either beam level measurements or set of beams level measurements (SS block level measurements). One advantage of configuring measurements on SS-block level (e.g., for adjacent cells, or for non-active sets of beams within current cell) is that UE performs beam management actions based on a set of beams instead on individual beam level. This reduces the potential beam updates in a case where BS/NW is able to send connection responses with wider beams (e.g., wider than used for transmitting beam reference signals).

Figure 5:
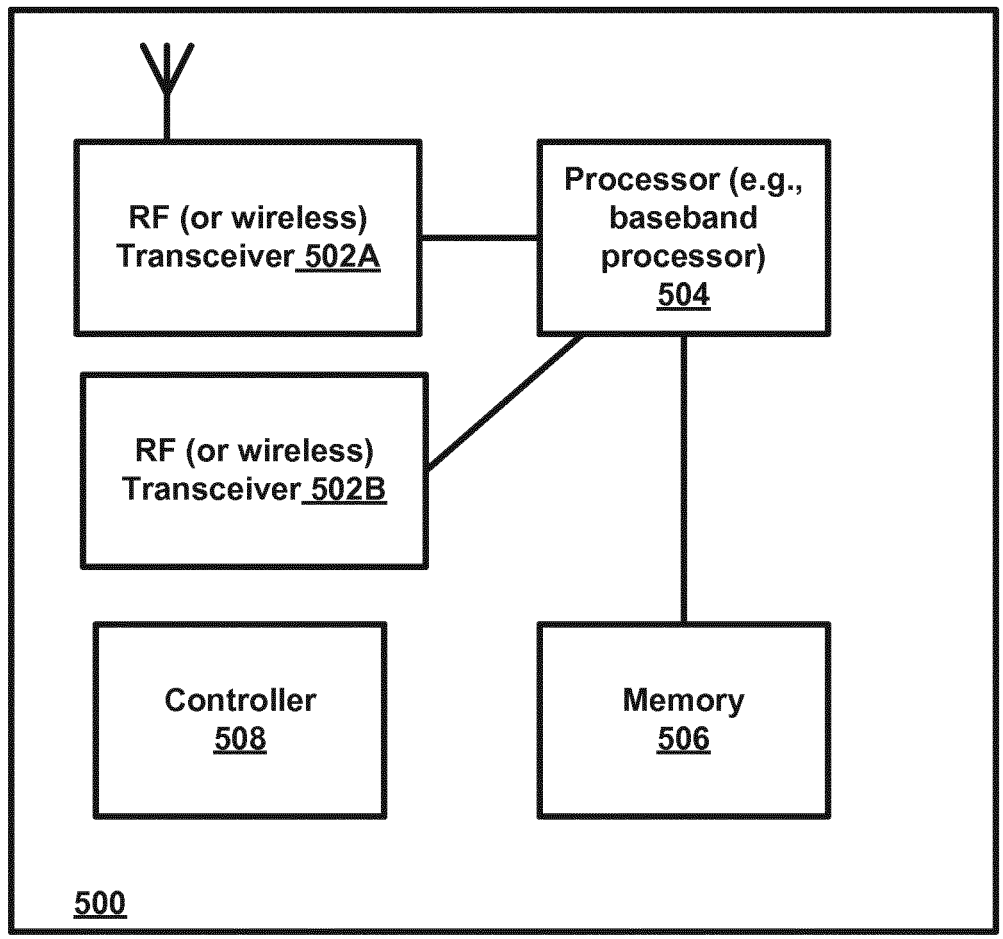
FIG. 5 is a block diagram of a node or wireless station (e.g., base station/access point or mobile station/user device) according to an example implementation.

FIG. 5 is a block diagram of a wireless station (e.g., AP or user device) 500 according to an example implementation. The wireless station 500 may include, for example, one or two RF (radio frequency) or wireless transceivers 502A, 502B, where each wireless transceiver includes a transmitter to transmit signals and a receiver to receive signals. The wireless station also includes a processor or control unit/ entity (controller) 504 to execute instructions or software and control transmission and receptions of signals, and a memory 506 to store data and/or instructions.

Processor 504 may also make decisions or determinations, generate frames, packets or messages for transmission, decode received frames or messages for further processing, and other tasks or functions described herein. Processor 504, which may be a baseband processor, for example, may generate messages, packets, frames or other signals for transmission via wireless transceiver 502 (502A or 502B). Processor 504 may control transmission of signals or messages over a wireless network, and may control the reception of signals or messages, etc., via a wireless network (e.g., after being down-converted by wireless transceiver 502, for example). Processor 504 may be programmable and capable of executing software or other instructions stored in memory or on other computer media to perform the various tasks and functions described above, such as one or more of the tasks or methods described above. Processor 504 may be (or may include), for example, hardware, programmable logic, a programmable processor that executes software or firmware, and/or any combination of these. Using other terminology, processor 504 and transceiver 502 together may be considered as a wireless transmitter/receiver system, for example.

In addition, referring to FIG. 5, a controller (or processor) 508 may execute software and instructions, and may provide overall control for the station 500, and may provide control for other systems not shown in FIG. 5, such as controlling input/output devices (e.g., display, keypad), and/or may execute software for one or more applications that may be provided on wireless station 500, such as, for example, an email program, audio/video applications, a word processor, a Voice over IP application, or other application or software.

In addition, a storage medium may be provided that includes stored instructions, which when executed by a controller or processor may result in the processor 504, or other controller or processor, performing one or more of the functions or tasks described above.

According to another example implementation, RF or wireless transceiver(s) 502A/502B may receive signals or data and/or transmit or send signals or data. Processor 504 (and possibly transceivers 502A/502B) may control the RF or wireless transceiver 502A or 502B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method, comprising:
   determining, by a user device, a first preferred downlink beam;
   sending, by the user device to a base station, an indication of the first preferred downlink beam;
   receiving, by the user device from the base station, a temporary configuration information at least for use in reporting an updated or second preferred downlink beam;
   detecting that the user device has not received a connection response message from the base station indicating that a connection has been established between the user device and the base station;
   determining, by the user device, a second preferred downlink beam;
   sending, by the user device to a base station in response to the detecting and based on the temporary configuration information, an indication of the second preferred downlink beam to the base station; and
   receiving, via the second preferred downlink beam, a connection response message from the base station, wherein
   the sending an indication of the first preferred downlink beam comprises sending a first random access preamble associated with the first preferred downlink beam, as part of a first random access procedure, to indicate the first preferred downlink beam to the base station;
   the sending an indication of the second preferred downlink beam comprises sending, by the user device to the base station in response to the detecting, a second random access preamble associated with the second preferred downlink beam, as part of a second random access procedure, to indicate the second preferred downlink beam; and
   wherein a radio network temporary identifier, obtained by the user device via the first random access procedure, is sent to the base station as part of the second random access procedure,
   the method further comprising:
   receiving, by the user device from the base station as part of the first random access procedure, a contention resolution message;
   starting a timer based on the contention resolution message;
   detecting an expiration of the timer without the user device receiving a connection response message from the base station that indicates a connection has been established between the user device and the base station; and
   wherein the sending the second random access preamble comprises sending, by the user device to the base station in response to the detecting, the second random access preamble, as part of a second random access procedure, to indicate the second preferred downlink beam.

2. The method of claim 1, wherein the temporary configuration information comprises at least one of:
   a radio network temporary identifier (RNTI) assigned to the user device; and
   a resource information, temporarily assigned to the user device, that identifies a resource for reporting the second preferred downlink beam to the base station.

3. The method of claim 1, wherein the temporary configuration information comprises:
   a radio network temporary identifier (RNTI) assigned to the user device, the method further comprising:
   receiving, by the user device from the base station, the radio network temporary identifier within a first random access procedure;
   sending, by the user device to the base station, the radio network temporary identifier within a second random access procedure that is used to send or report the second preferred downlink beam to the base station.

4. The method of claim 1, wherein the temporary configuration information comprises:
a resource information, temporarily assigned to the user device, that identifies a resource fora scheduling request or other uplink resource to be used by the user device to report or send the indication of the second preferred downlink beam to the base station.

5. The method of claim 4, wherein the resource information comprises at least one of the following:
a temporary scheduling request (SR) resource that is user device specific, to allow the user device to request an uplink grant for reporting a beam report;
a temporary scheduling request (SR) resource that includes a plurality of beam-specific resources that the user device may use to identify one or more preferred downlink beams.

6. The method of claim 1, wherein the receiving a temporary configuration comprises receiving, by the user device from the base station, a resource configuration that indicates uplink resources to be used by the user device to report one or more preferred downlink beams,
the method further comprising:
receiving, by the user device from the base station, a contention resolution message;
starting a timer based on the contention resolution message; and
sending, by the user device to the base station via the uplink resources, until expiration of the timer or until receipt of a connection response message from the base station that indicates a connection has been established between the user device and the base station, one or more beam reports indicating one or more preferred downlink beams.

7. The method of claim 6, wherein the uplink resources for reporting the beam reports comprises a temporary scheduling request resource that is user device specific, to allow the user device to request an uplinkgrant for reporting a beam report.

8. The method of claim 6, wherein the uplink resources for reporting the beam reports comprises a temporary scheduling request resource that includes a plurality of beam-specific resources that the user device may use to identify one or more preferred downlink beams.

9. The method of claim 1, further comprising:
receiving, by the user device, a default set of beam tracking parameters including a threshold value, via a contention resolution message from the base station without receiving a connection response message,
wherein the determining a second preferred downlink beam comprises, determining, based on the default set of beam tracking parameters, a second preferred downlink beam that is the threshold value better than the first preferred downlink beam, and
wherein the sending, the indication of the second preferred downlink beam to the base station comprises sending, by the user device, an indication of the second preferred downlink beam by either sending a random access preamble associated with the second preferred downlink beam or an indication of the second downlink beam via an uplink resource allocated to the user device.

10. The method of claim 1, wherein the determining a first preferred downlink beam comprises:
performing, by the user device, beam-level measurements for one or more downlink beams.

11. The method of claim 1, wherein the determining a first preferred downlink beam comprises:
performing, by the user device, beam set measurements for each of one or more sets of beams;
sending, by the user device to the base station, an indication of a preferred downlink set of beams; and
receiving, by the user device from the base station, an indication of a first preferred downlink beam within the preferred downlink set of beams that was indicated to the base station.

12. A computer program product embodied on a non-transitory computer-readable storage medium storing executable code that, when executed by at least one data processing apparatus, is configured to cause the at least one data processing apparatus to perform a method comprising:
determining, by a user device, a first preferred downlink beam;
sending, by the user device to a base station, an indication of the first preferred downlink beam;
receiving, by the user device from the base station, a temporary configuration information at least for use in reporting an updated or second preferred downlink beam;
detecting that the user device has not received a connection response message from the base station indicating that a connection has been established between the user device and the base station;
determining, by the user device, a second preferred downlink beam;
sending, by the user device to a base station in response to the detecting and based on the temporary configuration information, an indication of the second preferred downlink beam to the base station; and
receiving, via the second preferred downlink beam, a connection response message from the base station, wherein
the sending an indication of the first preferred downlink beam comprises sending a first random access preamble associated with the first preferred downlink beam, as part of a first random access procedure, to indicate the first preferred downlink beam to the base station;
the sending an indication of the second preferred downlink beam comprises sending, by the user device to the base station in response to the detecting, a second random access preamble associated with the second preferred downlink beam, as part of a second random access procedure, to indicate the second preferred downlink beam; and
wherein a radio network temporary identifier, obtained by the user device via the first random access procedure, is sent to the base station as part of the second random access procedure,
the method further comprising:
receiving, by the user device from the base station as part of the first random access procedure, a contention resolution message;
starting a timer based on the contention resolution message;
detecting an expiration of the timer without the user device receiving a connection response message from the base station that indicates a connection has been established between the user device and the base station; and
wherein the sending the second random access preamble comprises sending, by the user device to the base station in response to the detecting, the second random access preamble, as part of a second random access procedure, to indicate the second preferred downlink beam.

13. A method, comprising:

determining, by a user device, a first preferred downlink beam and a first random access preamble associated with the first preferred downlink beam;

sending, by the user device to a base station, the first random access preamble, as part of a first random access procedure, to indicate the first preferred downlink beam to the base station;

receiving, by the user device from the base station as part of the first random access procedure, a contention resolution message;

starting a timer based on the contention resolution message;

determining, by the user device, a second preferred downlink beam and a second random access preamble associated with the second preferred downlink beam;

detecting an expiration of the timer without the user device receiving a connection response message from the base station that indicates a connection has been established between the user device and the base station;

sending, by the user device to the base station in response to the detecting, the second random access preamble, as part of a second random access procedure, to indicate the second preferred downlink beam; and receiving, via the second preferred downlink beam, a connection response message from the base station.

14. The method of claim 13, further comprising:

receiving, by the user device from the base station, a radio network temporary identifier within the first random access procedure;

sending, by the user device to the base station, the radio network temporary identifier within the second random access procedure to identify the user device to the base station.

15. An apparatus, comprising:

at least one processor; and at least one memory including computer instructions that, when executed by the at least one processor, cause the apparatus to perform the method of claim 13.

16. A computer program product, the computer program product comprising a non-transitory computer-readable storage medium storing executable code that, when executed by at least one data processing apparatus, is configured to cause the at least one data processing apparatus to perform the method of claim 13.

* * * * *